JUNCTION TRANSISTORS USED TO APPROXIMATE NON-LINEAR FUNCTIONS

Filed June 2, 1959

INVENTOR.
ALAN R. PEARLMAN

BY KENWAY, JENNEY, WITTER & HILDRETH

ATTORNEYS

United States Patent Office 3,097,309

Patented July 9, 1963

3,097,309

JUNCTION TRANSISTORS USED TO APPROXIMATE NON-LINEAR FUNCTIONS

Alan R. Pearlman, Watertown, Mass., assignor to Clevite Corporation, Cleveland, Ohio, a corporation of Ohio Filed June 2, 1959, Ser. No. 817,512

4 Claims. (Cl. 307—88.5)

Figure 1:
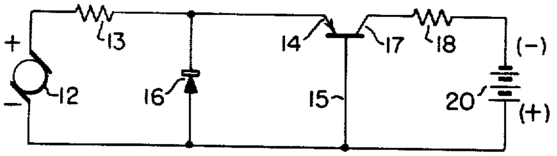

This invention relates in general to transistor circuits and in particular to applications of such circuits utilizing the non-linear current transfer characteristics of junction transistors.

Numerous transistorized devices and circuits are in use in which the transistors in a sense simply replace vacuum tubes. However, there are inherent characteristics of junction transistors which may be advantageously employed in areas which have no equivalents in vacuum tube circuitry.

In a simple common-base transistor circuit with the input to the emitter of the transistor, a resistor may be placed in the output or collector circuit to limit the amount of current passed in that circuit. The effect of the limiting resistor is to cause the collector voltage ultimately to limit or "bottom," at which point further increase in emitter current causes little or no increase in collector current, but will cause an increase in base current. The base current curve rises sharply beyond this point, and the collector current remains relatively constant with increasing emitter current.

The point at which the sharp break in the base current takes place can be adjusted in several ways. Perhaps the simplest method of adjustment may be obtained by variation of the voltages supplied to the transistor. Furthermore, it is possible to construct cascaded circuits to extend the applicability of the characteristics described above. In such circuits current transfer in the original junction transistor would be first from the emitter to the collector and then from the emitter to the base circuit of the first transistor, and hence to the emitter of a second transistor. The process would then be repeated with a transfer to the base of the second transistor and so on through any desired number of transistors. In the cascaded or iterative arrangement, the input would be to the emitter of the first transistor and the output would be taken from one or more of the collectors of the transistor or from the base of the final transistor.

It is a primary object of the present invention to utilize the non-linear current transfer characteristics of junction transistors in practical devices.

It is another object of the present invention to provide practical means for approximating functions by sets of broken-line segments.

It is a further object of the present invention to protect current measuring instruments from overload.

In general, the present invention in its simplest form is organized about common-base transistor circuits in which the input is applied to the emitter of a junction transistor and the output is taken from the collector circuit. In a typical circuit, a PNP junction transistor is provided with bias supplies and a series impedance in the collector circuit.

For an idealized transistor so connected, the collector current varies linearly with the emitter current until the collector current reaches a value equal to the collector bias supply divided by the series impedance in the collector circuit. At this point the collector may be said to have reached saturation or "bottomed." Further increases in emitter current cause no further increase in collector current, but the base current which was, up to this point, negligibly small rises abruptly.

One way in which this characteristic behavior of junction transistors may be used advantageously is in a circuit for approximating any desired function by a series of broken-line segments. A first junction transistor may be connected in the manner outlined above, and the series impedance in the collector circuit may be constituted of a limiting resistor. The base of the first transistor may then be connected directly to the emitter of a second transistor. Additional transistors may be added in the same fashion, the base of each being connected directly to the emitter of the next in line.

Each transistor is provided with its own 2- or 3-terminal collector network, which may contain one or more circuit elements such as resistors, one terminal of which is connected to the transistor, one terminal to a common nodal point, and in the case of a 3-terminal network, one end directly to the collector-bias voltage supply. The various resistors or other elements are chosen to control the slope and break point of each segment of the curve approximating the desired function, and the total output current of the transistor ensemble then is that function.

Figure 2:
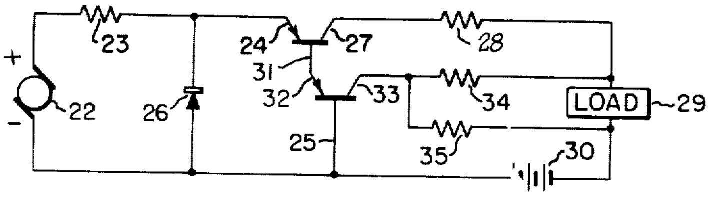
Figure 2:
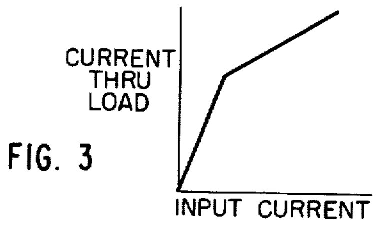
Figure 2:
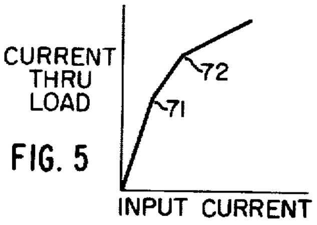
Figure 2:
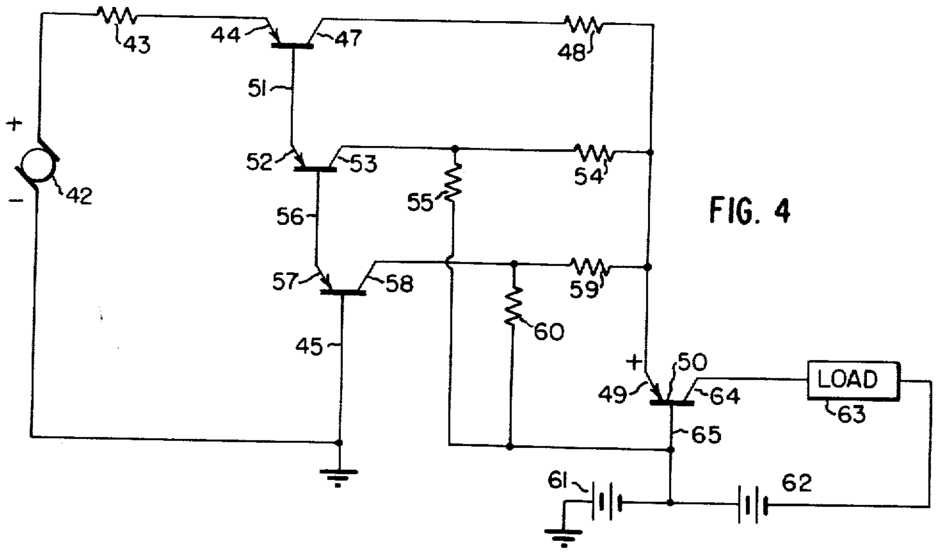

For a better understanding of the present invention together with other objects, features and advantages, reference should be made to the following detailed description of preferred embodiments thereof which should be read in connection with the appended drawings in which:

FIG. 1 is a schematic diagram of a simple circuit which illustrates fundamental concepts underlying the present invention, FIG. 2 is a schematic diagram of a circuit for providing the desired function approximation, FIG. 3 is a graph of load current vs. input current in the circuit of FIG. 2, FIG. 4 is a schematic diagram of a more complex circuit of the type shown in FIG. 2, and FIG. 5 is a graph of load current vs. input current in the circuit of FIG. 4.

FIG. 1 illustrates a circuit which is useful in explaining the operation of the invention. The circuit includes a source of D.C. voltage 12 to the positive terminal of which a series resistor 13 is connected. The series resistance is effective to convert the source 12 into a "current generator," and adjustment of the output of the voltage source results in an adjustable current source for the circuit because of the series resistance.

The series resistor 13 is connected to the emitter 14 of a transistor and the negative terminal of the source 12 is connected to the base 15 of the same transistor. A diode 16 is connected between the emitter 14 and the base 15 to provide a path around the transistor for currents of reversed polarity.

The transistor also includes a collector 17 to which a series impedance, in this case a resistor 18, is connected. The resistor 18 is then connected to the negative terminal of a collector bias supply 20, and the positive terminal of the supply 20 is returned to the base 15 of the transistor.

In the illustrated circuit for an idealized transistor, the collector current $I_c$ will vary linearly with the emitter current $I_e$ over a considerable range of voltage from the source 12. The voltage of the supply 20 may in accordance with convention be identified as $V_{cc}$. In this situation, linear variation of $I_c$ with $I_e$ will obtain until:

$$I_c=\frac{V_{cc}}{R}$$

where R is the value of the series resistor 18 in the collector circuit. Beyond this point, $I_c$ remains constant, the collector having reached saturation. At this point, the base current $I_b$, which had previously been rising slowly, rises abruptly at approximately the same rate as the emitter current $I_e$ rises. Thus, the collector current cannot increase beyond the limit $V_{cc}/R$. Although some slight variation from the theoretical limit may occur because of non-linear current transfer ratio with changes in operating point as well as with temperature changes, this error is negligible unless extreme accuracy is required. In those situations where great precision is required, the error may be compensated for by the addition of suitable circuit components.

A practical circuit for obtaining consecutive broken-line characteristics for approximating non-linear functions is illustrated in FIG. 2. Here again, a voltage source 22 is provided with its positive terminal connected to a series resistor 23 which is in turn connected to the emitter 24 of a first transistor. The negative terminal of the source 22 is connected to the base 25 of a second transistor. A diode 26 is connected between the emitter of the first transistor and the base of the second transistor to provide a path for currents of reversed polarity. Connected to the collector 27 of the first transistor is a series resistor 28 which in turn is connected through a load 29 to the negative terminal of a collector bias supply 30. The base 31 of the first transistor is connected directly to the emitter 32 of the second transistor. The collector 33 of the second transistor is connected through a series resistor 34 to the junction of the series resistor 28 and the load 29. The collector 33 of the second transistor is also connected through a second resistor 35 to the junction of the load 29 and the collector bias supply 30. The positive terminal of the collector bias supply 30 is returned to the base 25 of the second transistor and to the negative terminal of the voltage source 22.

The operation of the circuit of FIG. 2 is basically similar to that of the circuit in FIG. 1. However, certain differences exist by reason of the addition of a second transistor and the interconnection of resistors 34 and 35 from the collector 33 of the second transistor to opposite sides of the load 29. Assuming operation of the first transistor parallels that of the transistor illustrated in FIG. 1, the transfer of emitter current from the collector 27 of the first transistor to the base 31 of that transistor causes increased emitter current in the emitter 32 of the second transistor. Here the original transfer process is repeated as current increases in the circuit of collector 33 of the second transistor until transfer is made to the base 25 of the second transistor.

The resistors 34 and 35 are of values chosen so that a desired fraction of the collector current in the second transistor is diverted around the load 29.

In FIG. 3 current through the load 29 is plotted against input current in the circuit of FIG. 2. As the voltage from the source 22 is varied, the emitter current of the first transistor is increased with a corresponding increase in collector current through the load 29. At the point of transition from the first to the second transistor which occurs upon saturation of the collector 27 of the first transistor, a break in load current is obtained. This break is indicated in the graph of FIG. 3 by the knee in the curve. The transition from one transistor to the other is in practice somewhat less abrupt than it appears in the graph. This is due to the fact that in practical transistors the characteristics are quite non-linear.

In FIG. 4, another embodiment illustrating the general case of approximating non-linear functions is shown. In this instance, three transistors are used in the current transfer function and these are representative of a general type of circuit in which any reasonable number of transistors could be used. Again, a generator 42 having an adjustable D.C. output voltage is provided. A series resistor 43 is interposed between the positive terminal of the generator 42 and the emitter 44 of a first transistor. The negative terminal of the generator 42 is connected to the base 45 of a final transistor of the current transfer group. The first transistor has its collector 47 connected through a series resistor 48 to the emitter 49 of an output or mixing transistor 50. The base 51 of the first transistor is connected directly to the emitter 52 of a second current transfer transistor and the collector 53 of the second transistor is connected through a series resistor 54, in common with the resistor 48 to the emitter 49 of the output transistor. The collector 53 is connected also to a bypass resistor 55.

The base 56 of the second transistor is connected directly to the emitter 57 of a third transistor. In similar fashion to the arrangement of the second transistor, the collector 58 of the third transistor is connected through a series resistor 59 in common with the other collector resistors 48 and 54 to the output transistor emitter 49. The collector of the third transistor is also connected to a bypass resistor 60, and the base 45 of the third transistor is returned to the negative terminal of the generator 42.

The load and bias circuit is composed of two D.C. voltage sources 61 and 62 which are connected in series. The load 63 is connected between the collector 64 of the output transistor 50 and the high negative side of the source 62. The base 65 of the output transistor is connected in common with the bypass resistors 55 and 60 to the junction of the series-connected sources 61 and 62.

In FIG. 5, the current through the load 63 is plotted against the input current in the circuit of FIG. 4. The various transfer points which are reached as each successive collector becomes saturated are indicated by the breaks 71 and 72 on the graph of FIG. 5. As in the previously illustrated circuit, the transfer of emitter current from the collector of the first transistor to the base of that transistor and emitter of the succeeding transistor and so forth provides a set of broken-line segments approximating a non-linear function.

Any non-linear function capable of representation by applying a positively increasing direct current to the input terminals of the circuit can be approximated. Obviously, as many segments of the characteristic may be obtained as are desired by the incorporation of additional transistors in the circuit in the same manner as is shown. The operation of each successive transistor is identical to that described for those shown.

Although what has been illustrated and described constitute specific applications of the non-linear current transfer characteristics of junction transistors, namely the approximation of various functions by broken-line segments, numerous other applications of the invention will suggest themselves to those skilled in the art. By way of example, in its simplest form the invention may be applied to the problem of instrument protection by the incorporation of a resistor of the proper value in series with the instrument in the collector circuit of a transistor. Therefore, the invention should be limited only by the spirit and scope of the appended claims.

What is claimed is:

1. A circuit for approximating non-linear functions comprising a first junction transistor having a base, an emitter and a collector, means for applying a linearly direct current input signal to said emitter of said first junction transistor, a second junction transistor having a base, an emitter and a collector, the emitter of said second transistor being directly connected to the base of said first transistor, a third junction transistor having a base, an emitter and a collector, the emitter of said third transistor being directly connected to the base of said second transistor, the base of said third transistor being returned to said means for applying an input signal, limiting resistors of decreasing magnitude connected to the collectors of each of said transistors, a mixing network including a load, bypass resistors connected to the collectors of said second and third transistors, and a source of bias voltage, said limiting resistors and said bypass resistors being connected to said mixing network to provide currents through said load varying as current transfer from the first to subsequent transistors occurs, said current through said load approximating a non-linear function.

2. A circuit as defined in claim 1 wherein said mixing network includes an output transistor having an emitter, a base and a collector, said emitter being connected to said limiting resistors, said base being connected to said bypass resistors, and said collector being connected through said load and at least a portion of said source of bias voltage to said base.

3. A circuit for providing an output current through a load varying non-linearly with linear increases in input current comprising a plurality of junction transistors, means for varying the input current to the first of said plurality of transistors, impedance means in the collector circuit of said first transistor for limiting the flow of current therethrough, increases in input current causing an increase of base current over a pre-established value in said first transistor, the base of said first transistor being connected so as to direct all base current to the emitter of said second transistor, and impedance means in the collector circuit of said second transistor, said load being connected substantially in series with the collectors of said transistors and said means for varying said input current whereby the current through said load varies non-linearly.

4. A circuit for approximating non-linear functions comprising a plurality of junction transistors each having an emitter, a base and a collector, said transistors being connected in cascade so that the entire base current of each transistor but the last is directed to the emitter of the succeeding transistor, means for applying a linearly variable input signal between the emitter of the first and base of the last transistor of the cascade, impedance means of decreasing magnitude in the collector circuit of each of said plurality of transistors, a load and a source of bias voltage in the collector circuit of said transistors whereby transfers of current in said plurality of said transistors due to linear increase in magnitude of said input signal cause a current through said load approximating a non-linear function.

References Cited in the file of this patent

UNITED STATES PATENTS

| | | |
|---|---|---|
| 2,663,806 | Darlington | Dec. 22, 1953 |
| 2,864,904 | Jensen | Dec. 16, 1958 |
| 2,964,656 | Bissell et al. | Dec. 13, 1960 |

UNITED STATES PATENT OFFICE

CERTIFICATE OF CORRECTION

Patent No. 3,097,309 July 9, 1963

Alan R. Pearlman

It is hereby certified that error appears in the above numbered patent requiring correction and that the said Letters Patent should read as corrected below.

Column 4, line 58, after "linearly" insert -- variable --.

Signed and sealed this 25th day of February 1964.

(SEAL)
Attest:

ERNEST W. SWIDER

Attesting Officer

EDWIN L. REYNOLDS

Acting Commissioner of Patents